(12) United States Patent
Koike et al.

(10) Patent No.: US 7,747,276 B2
(45) Date of Patent: Jun. 29, 2010

(54) MOBILE COMMUNICATION TERMINAL AND COMMUNICATION CONTROL METHOD

(75) Inventors: Atsushi Koike, Yokohama (JP); Katsuya Miyata, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 809 days.

(21) Appl. No.: 11/365,250

(22) Filed: Mar. 1, 2006

(65) Prior Publication Data

US 2006/0211444 A1 Sep. 21, 2006

(30) Foreign Application Priority Data

Mar. 1, 2005 (JP) ............................... 2005-055643

(51) Int. Cl.
*H04M 1/00* (2006.01)
(52) U.S. Cl. ................................ 455/550.1; 455/552.1
(58) Field of Classification Search .................. None
See application file for complete search history.

(56) References Cited

U.S. PATENT DOCUMENTS

| | | | |
|---|---|---|---|
| 5,974,330 A | 10/1999 | Negishi | |
| 6,490,455 B1 * | 12/2002 | Park et al. | 455/456.4 |
| 6,807,413 B1 * | 10/2004 | Honda | 455/414.1 |
| 2003/0134637 A1 | 7/2003 | Cooper | |

FOREIGN PATENT DOCUMENTS

| | | |
|---|---|---|
| CN | 1090429 C | 8/1994 |
| JP | 06-013968 | 1/1994 |
| JP | 10-304071 | 11/1998 |
| JP | 11-234389 | 8/1999 |
| JP | 2000-083283 | 3/2000 |
| JP | 2001-119452 | 4/2001 |
| JP | 2003-153325 | 5/2003 |
| JP | 2004-297480 | 10/2004 |
| KR | 2002-0041779 | 6/2002 |

OTHER PUBLICATIONS

Office Action dated Mar. 7, 2008 (Summary only in Chinese and the "Detailed Action" in Chinese together with an English translation) issued for the corresponding Chinese Application No. 2006100198215 (9 pgs.).

* cited by examiner

*Primary Examiner*—Dwayne Bost
*Assistant Examiner*—Phuoc Doan
(74) *Attorney, Agent, or Firm*—Cohen Pontani Lieberman & Pavane LLP

(57) ABSTRACT

When the user of the mobile communication terminal produces the originating operation while in the idle state with the wireless system C, the control section acquires the input of the user of the mobile communication terminal via the key input section (step 302) and acquires, through the present position acquisition section, area identification data of an area L where it is placed in the idle state (step 304). The control section makes a reference to the table of connection scores held in the storage section and acquires a connection score p for the system A corresponding to the area L (step 306). Next, the control section judges the start of origination to the system A by using the connection score p (step 308).

4 Claims, 10 Drawing Sheets

FIG. 2

| SPECIFIC BASE STATION NUMBER | CONNECTION SCORE FOR THE SYSTEM A | CONNECTION SCORE FOR THE SYSTEM B |
|---|---|---|
| 24680 | 8 | 5 |
| 112233 | 0.2 | 12 |
| 135792 | 1 | 1 |
| . | . | . |
| . | . | . |
| . | . | . |

FIG. 4

| INITIAL VALUES OF CONNECTION SCORES | JUDGING THE START OF CONNECTION | UPDATING THE CONNECTION SCORES | | |
|---|---|---|---|---|
| | | S314 | S312 | S318 |
| ALL 1 | ·$p \geq 1 \Rightarrow$ START<br>·$0 \leq p < 1 \Rightarrow$ DOES NOT START | $p_1 = p + 0.5$ | $p_2 = p \times 0.5$ | $p_3 = p + 0.1$ |

FIG. 5

| NUMBER OF TIMES OF ORIGINATION | CONNECTION SCORES FOR THE SYSTEM A | JUDGING THE START OF CONNECTION TO THE SYSTEM A |
|---|---|---|
| 1 | 1 | STARTS |
| 2 | 0.5 | DOES NOT START |
| 3 | 0.6 | DOES NOT START |
| 4 | 0.7 | DOES NOT START |
| 5 | 0.8 | DOES NOT START |
| 6 | 0.9 | DOES NOT START |
| 7 | 1 | STARTS |

FIG. 6

| NUMBER OF TIMES OF ORIGINATION | CONNECTION SCORES FOR THE SYSTEM A | JUDGING THE START OF CONNECTION TO THE SYSTEM A |
|---|---|---|
| 1 | 1 | STARTS |
| 2 | 1.5 | STARTS |
| 3 | 2 | STARTS |
| 4 | 2.5 | STARTS |
| 5 | 3 | STARTS |
| 6 | 3.5 | STARTS |
| 7 | 4.0 | STARTS |
| 8 | 2 | STARTS |
| 9 | 1 | STARTS |
| 10 | 0.5 | DOES NOT START |

FIG. 7

| INITIAL VALUES OF CONNECTION SCORES | JUDGING THE START OF CONNECTION | UPDATING THE CONNECTION SCORES | | |
|---|---|---|---|---|
| | | S314 | S312 | S318 |
| ALL 1 | • $p \geq 1 \Rightarrow$ STARTS<br>• $0 \leq p < 1 \Rightarrow$ JUDGES TO START WITH PROBABILITY p, JUDGES NOT TO START WITH PROBABILITY (1−p) | $p_1 = p + 0.5$ | $p_2 = p \times 0.5$ | $p_3 = p$ |

मेरे लिए # MOBILE COMMUNICATION TERMINAL AND COMMUNICATION CONTROL METHOD

CROSS-REFERENCE TO RELATED APPLICATION

This application is based upon and claims the benefit of priority from the prior Japanese Patent Application No. 2005-055643, filed Mar. 1, 2005, the entire contents of which is incorporated herein by reference.

BACKGROUND OF THE INVENTION

1. Field of the Invention

The present invention relates to a mobile communication terminal and a communication control method for shortening the time required for connection to a wireless system and for decreasing the consumption of electric power.

2. Description of the Related Art

A plurality of wireless systems have nowadays been placed in practice, such as CDMA 2000 (Code Division Multiple Access), EV-DO (Evolution-Data Optimized), W-CDMA (a European version of Wideband CDMA) and the like. In the future, it is expected that even the same wireless system will be operated at different frequency bands such as a 800 MHz band, a 1.7 GHz band, a 2 GHz band and so on. A mobile communication terminal has been developed that can be used for a plurality of wireless systems or over a plurality of frequency bands.

When a power source circuit is closed, the mobile communication terminal performs acquisition acquerement of control signals transmitted from the base stations of the systems (inclusive of when different frequency bands are used by the same system) in accordance with an order based on the data of a preferred roaming list stored in the terminal and is shifted into an idle state after the synchronization is synchronized. Even in the case of the control signal of the system in the idle state being lost or even in the case where it becomes difficult to maintain the idle state due to a deterioration in the electromagnetic wave environment, the mobile communication terminal carries out the acquisition operation in accordance with an order based on the data of the preferred roaming list and is shifted into the idle state with the system that is acquired.

There is a technology that has been known for varying the order of acquiring a plurality of systems depending upon the reception quality (RSSI or Ec/Io) in the idle state. For example, Japanese Laid-Open Patent Application No. JP-A-2003-153325 discloses an art where two systems A and B are registered in this order to the preferred roaming list. If this system A that had been in the idle state is lost, there is a high probability of acquiring system A if the reception quality of system A is better than a given condition. In addition if acquired, the acquisition operation is carried out again in order of A→B.

However, if the reception quality of system A is poorer than the given condition, the probability of acquiring system A again becomes low. In this case, acquisition of system A is not attempted but the operation is started for acquiring system B in order to shorten the time for re-acquisition and to decrease the consumption of electric power.

In the mobile communication terminal capable of using a plurality of wireless systems however, the system in the idle state may not often be the same as the system that originates. For example, the system can be placed in the idle state with CDMA 2000 and originate in a wireless LAN only at the time of receiving the streaming of dynamic images.

As a concrete example, there is contrived a mobile communication terminal that operates as shown in FIG. 10. It is presumed that the mobile communication terminal can be used with three systems A, B and C, and is placed in the idle state with system C. If the origination operation is performed while in the idle state with system C (step 102), the operation is conducted to acquire system A (step 104). Here, if system A is acquired, the communication starts with system A (step 106). If system A is not acquired, the operation works to acquire system B (step 108). Here, if system B is acquired, the communication starts with system B (step 110). If system B is not acquired, the operation works to acquire system C (step 112). Here, if system C is acquired, the communication starts with system C (step 114). If system C is not acquired, the origination fails and an idle state is assumed (step 116).

Here, concerning the mobile communication terminal that performs the above sequence, origination in an area which is out of the service area for system A results in the waste of time and electric power if it is attempted to acquire system A at step 104. In an area which is out of the service area for system A, the origination shall not be performed to system A but shall be performed to system B or to system C irrespective of the condition under which system C is receiving the electromagnetic waves.

However, the art disclosed in the above Japanese Laid-Open Patent Application No. JP-A-2003-153325 does not give consideration to changing the system at the source of origination which depend upon the area where the mobile communication terminal is placed in the idle state not being capable of shortening the time required for connection to the wireless system and not being capable of decreasing the consumption of electric power.

SUMMARY OF THE INVENTION

The present invention was accomplished in view of the above circumstances and has an object of providing a mobile communication terminal and a communication control method capable of shortening the time required for connection to a wireless system and of decreasing the consumption of electric power.

In order to achieve the above object according to the present invention, there is provided a mobile communication terminal capable of using a plurality of wireless systems, comprising: a storage means for storing area identification data identifying each communication area and wireless system selection data respectively corresponding to said area identification data for selecting a wireless system among said plurality of wireless systems; a present position acquisition means for acquiring present position data; and a wireless system determination means for selecting area identification data from said storage means corresponding to present position data acquired by said present position acquisition means and determining a wireless system to be used referring to said wireless system selection data corresponding to said selected area identification data.

In order to achieve the above object according to the present invention, there is further provided a mobile communication terminal capable of using a plurality of wireless systems, comprising: a storage means for storing area identification data identifying each communication area and connection indexes respectively corresponding to said area identification data showing an ease of connecting to each plurality of wireless systems; a present position acquisition means for acquiring present position data; a selection means for selecting area identification data from said storage means corresponding to present position data acquired by said present position acquisition means; an extraction means for extracting a connection index of each said plurality of wireless systems from said storage means corresponding to area identification data selected by said selection means; and a wireless system determination means for determining, as a wireless system to be used, a wireless system having a connection index most easily connectable from among said connection indexes of said plurality of wireless systems extracted by said extraction means.

In order to achieve the above object according to the present invention, there is still further provided a communication control method performed at a mobile communication terminal capable of using a plurality of wireless systems, comprising: a present position acquisition process for acquiring present position data; and a wireless system determination process for storing beforehand area identification data identifying each communication area and wireless system selection data for selecting a wireless system from among a plurality of wireless systems corresponding to said area identification data respectively, selecting area identification data corresponding to present position data acquired by said present position acquisition process from among stored area identification data, and determining a wireless system to be used referring to said wireless system selection data corresponding to said selected area identification data.

In order to achieve the above object according to the present invention, there is still further provided a communication control method performed in a mobile communication terminal capable of using a plurality of wireless systems, comprising: a present position acquisition process for acquiring present position data; an extraction process for storing beforehand area identification data identifying each communication area and connection index respectively corresponding to said area identification data and showing an ease of connecting to each plurality of wireless systems, selecting area identification data corresponding to present position data acquired by said present position acquisition process from among stored area identification data, and extracting a connection index of each of a plurality of wireless systems corresponding to said selected area identification data; and a wireless system determination process for determining, as a wireless system to be used, a wireless system having a connection index most easily connectable from among said connection index of said plurality of wireless systems extracted by said extraction process.

The present invention makes it possible to shorten the time required for connection to a radio system and to decrease the consumption of electric power.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a diagram illustrating a table of connection scores for system A and system B;

FIG. 4 is a diagram illustrating a method of judging the start of origination by using connection scores and of updating the connection scores;

FIG. 5 is a diagram illustrating changes in the connection scores of when system A has repetitively performed the origination processing out of the service area and the results of judging the start of origination;

FIG. 6 is a diagram illustrating changes in the connection scores of when system A has changed from inside the service area to out of the service area and the results of judging the start of origination;

FIG. 7 is a diagram illustrating another method of judging the start of origination by using connection scores and of updating the connection scores;

DETAILED DESCRIPTION OF THE PREFERRED EMBODIMENTS

The present invention will hereinafter be described in detail by way of preferred embodiments with reference to the accompanying drawings.

A. First Embodiment

A-1. Configuration

Figure 1:
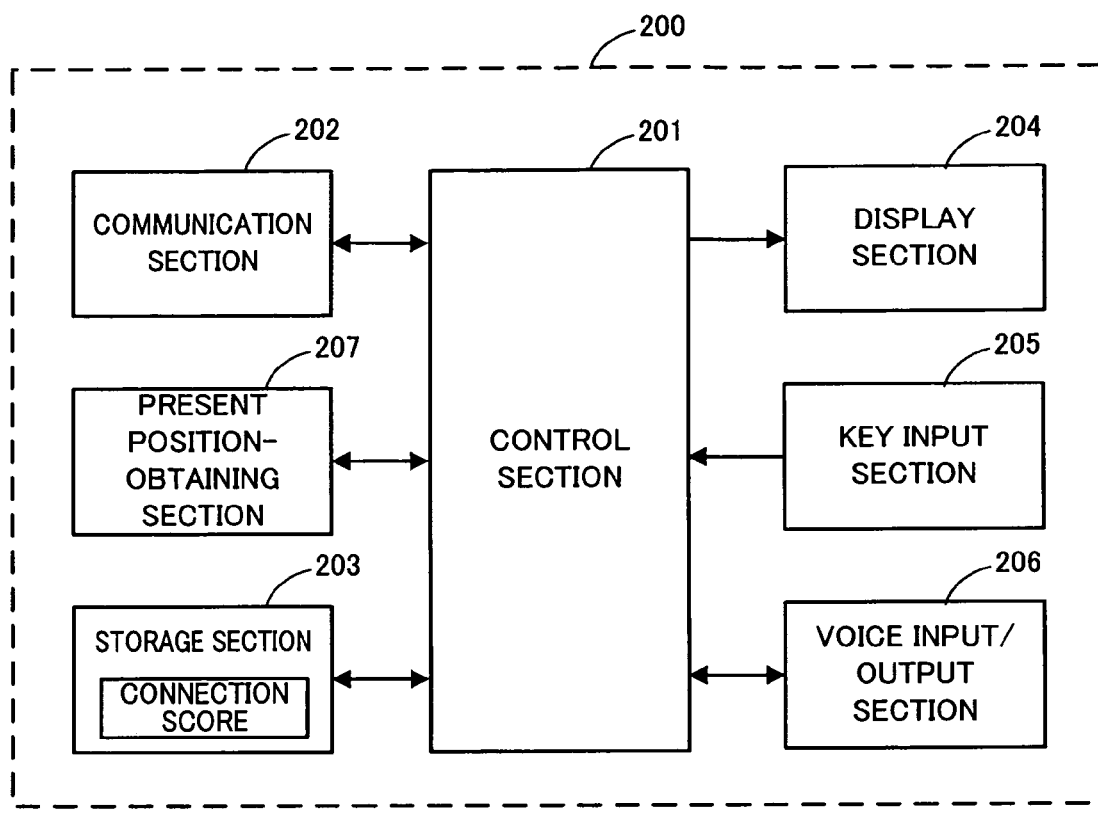
FIG. 1 is a block diagram illustrating the constitution of a mobile communication terminal 200 according to the first embodiment of the invention.

FIG. 1 is a block diagram illustrating the constitution of a mobile communication terminal 200 according to the first embodiment of the invention. The mobile communication terminal 200 shown here includes a control section 201, a communication section 202, a storage section 203, a display section 204, a key input section 205, a voice input/output section 206, and a present position acquisition section 207.

The communication section 202 transmits and receives signals to and from a wireless base station. It further measures the level of signals received from the wireless base station and particularly, the reception level of pilot signals. The communication section 202 copes with a plurality of communication systems or frequency bands. The storage section 203 stores parameters, programs, voices, images, mails, web and any other user data necessary for the communication which may be a memory incorporated in a mobile communication terminal or an external memory such as a detachable memory card or the like. Connection scores that will also be described later are stored in the storage section 203.

The display section 204 is a display screen such as a liquid crystal display, which displays the mail, web, the basic operation screen, etc. It may further include a plurality of display screens such as a main screen and a sub-screen. The key input section 205 receives inputs from a user through a ten key pad, function keys, a touch panel or voice input. The voice input/output section 206 includes a voice input section such as a microphone, for converting the input voice into signals and a voice output section, such as a loud speaker, for producing a voice. The present position acquisition section 207 acquires the present position of the mobile communication terminal. The present position acquisition section 207 may be included in the communication section 202.

The control section 201 controls the mobile communication terminal as a whole, i.e., controls the communication section 202, storage section 203, display section 204, key input section 205, voice input/output section 206, and present position acquisition section 207. When, for example, a user carries out a voice talk operation via the key input section 205, the control section 201 controls the communication section 202 based on a program for establishing a communication line for voice talk stored in the storage section 203 and establishes a communication line. The communication line that is established is displayed on the display section 204. A voice signal input through the voice input/output section 206 is transmitted to a remote person through the communication section 202 while the voice data received through the communication section 202 is output as a voice signal from the voice input/output section 206.

Next, described below are connection scores stored in the storage section 203. The connection scores are indexes which indicate whether a connection can be made to a wireless system and are set as to assume a large value when, for example, the connection to the system is highly probable. A method of setting the connection scores will be described later. The mobile communication terminal 200 holds, in the storage section 203, connection scores that are different depending upon the areas. The user of the mobile communication terminal 200 in many cases performs the communication in a predetermined area such as at a house or a desk in an office. The connection scores for the areas serve as indexes indicating whether the connection can be made to the system in the respective areas.

FIG. 2 illustrates a table of connection scores for system A and system B.

In the first column of the table shown in FIG. 2, area identification data is written which identifies the areas. The area identification data may be any data provided that is capable of identifying the areas. For example, the data may be a region defined by using latitudes and longitudes, base station identification data of a base station placed in the idle state at a remote end or sector identification data. FIG. 2 uses specific base station numbers assigned to the base stations as area identification data.

A second column of the table includes connection scores for system A corresponding to the areas (specific base station numbers). The third column includes connection scores for system B corresponding to the areas (specific base station numbers). When, for example, the mobile communication terminal 200 is placed in the idle state with a base station of a specific base station number "112233", the connection score for system A becomes "0.2" and the connection score for system B becomes "12". The connection scores of the mobile communication terminal 200 held at the time of shipping (this means transfer for sale) may all have the same value or may all have different values depending upon the areas as determined through the investigation of the areas where the system can be used. Or, after shipping, the user of the mobile communication terminal 200 may change the connection scores. Further, the storage section 203 may hold an upper-limit value and a lower-limit value that can be assumed by the connection scores. In addition, the control section 201 may update the connection scores between the lower-limit value and the upper-limit value.

A-2. Operation

Figure 3:
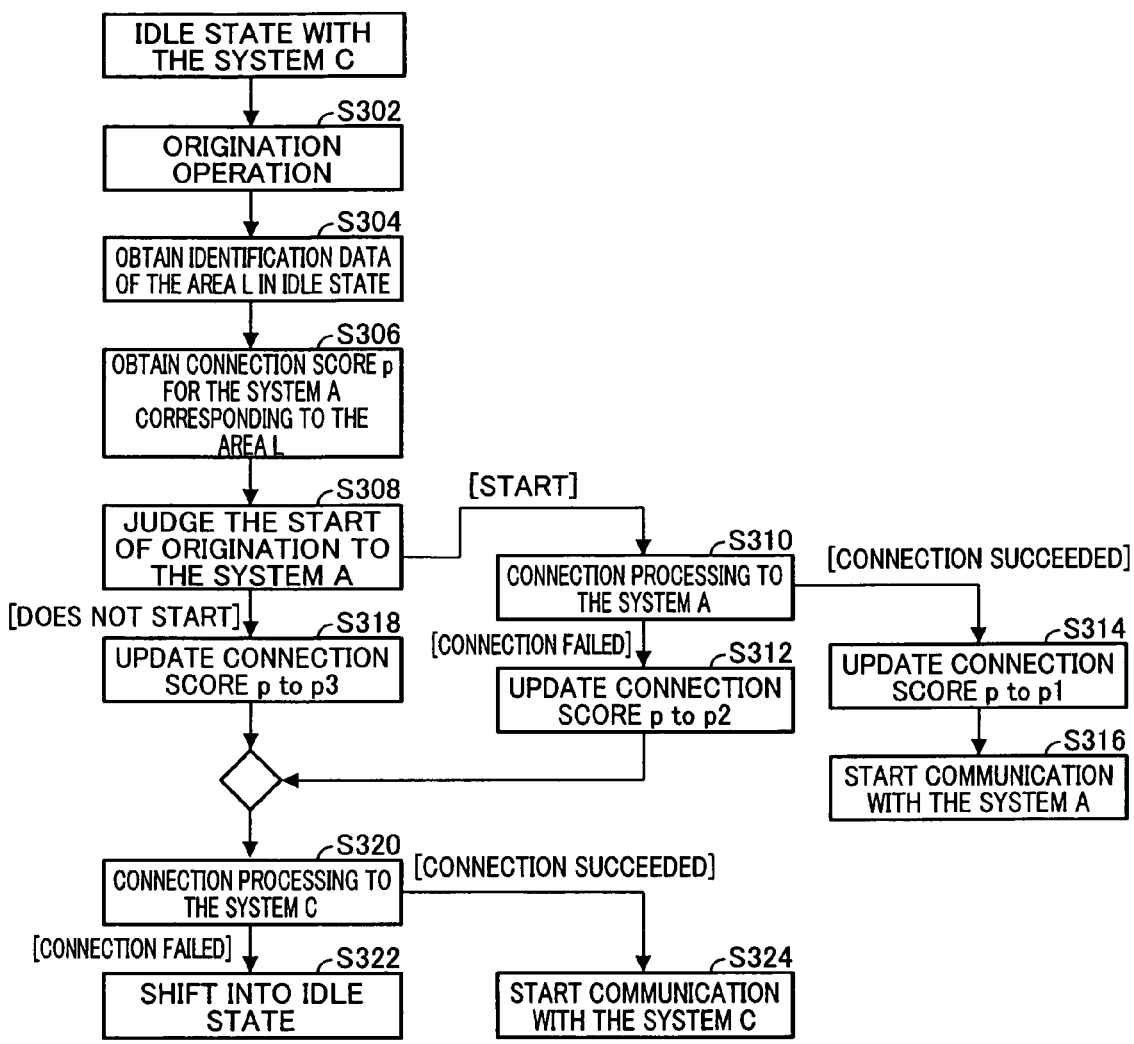
FIG. 3 is a diagram illustrating a sequence of origination according to the first embodiment.

Next, described below with reference to FIG. 3 is a sequence of origination of the mobile communication terminal 200 constituted as described above. It is presumed here that the mobile communication terminal 200 can be used with two different wireless systems A and C and is set to be used preferentially with system A rather than with system C. However, this is merely an example and the number of wireless systems that can be used is not limited to two but more than two. This makes it possible to more flexibly cope with a mobile communication terminal that can use a plurality of wireless systems. At the time of origination, therefore, the time for connection can be shortened and the consumption of electric power can be effectively decreased. In addition, the wireless systems include the cases where the systems are different, such as CDMA 2000, EV-DO, W-CDMA and wireless LAN, as well as the cases where the frequency bands are not the same even though the same system is used. It is presumed that the mobile communication terminal 200 is in the idle state with wireless system C.

Referring to FIG. 3, when the user of the mobile communication terminal 200 performs the originating operation while in the idle state with wireless system C, the control section 201 acquires the input of the user of the mobile communication terminal 200 via the key input section 205 (step 302) and acquires, through the present position acquisition section 207, an area identification data of an area L where it is placed in the idle state (step 304). The control section 201 makes a reference to the table of connection scores held in the storage section 203 and acquires a connection score p for system A corresponding to the area L (step 306). Next, the control section 201 judges the start of origination to system A by using the connection score p (step 308). A concrete example of the judging method will be described later.

When the start of connection to system A is judged at step 308, the control section 201 performs a connection processing to system A via the communication section 202 (step 310). When the connection is successful, the control section 201 updates the connection score p for system A corresponding to the area L held in the storage section 203 to $p_1$ (step 314) and starts the communication with system A (step 316). When the connection to system A has failed, the control section 201 updates the connection score p for system A corresponding to the area L held in the storage section 203 to $p_2$ (step 312), and performs a connection processing to system C via the communication section 202.

When it is judged at step 308 that the connection to system A has not been started, the control section 201 updates the connection score p for system A corresponding to the area L held in the storage section 203 to $p_3$ (step 318) and performs a connection processing to system C via the communication section 202 (step 320). When the connection to system C is successful, the communication starts with system C (step 324). When the connection processing has failed, it means that the origination has failed and an idle state is assumed (step 322).

Next, described below with reference to FIG. 4 is a method of judging the start of origination using the connection scores and of updating the connection scores. In this example, the connection scores are all real numbers of a sign which is not negative and are all set to assume an initial value of 1. As for judging the start of origination at step 308, the control section 201 judges that the origination to system A has started when the connection score is not smaller than 1 and judges that the origination has not started when the connection score is not smaller than 0 but is smaller than 1. The connection score is updated as described below.

Concerning the updating of when the connection processing is performed to system A and when the connection is successful (step 314), the pre-origination processing connection score is increased by "0.5". The value for increment is not limited to "0.5" but may be any other value. In addition to the method of adding a predetermined value, there can be further contrived a method of multiplication by a predetermined value. For example, the pre-origination score may be multiplied by "1.2". Further, the updating may be performed by a combination of the addition and the multiplication or by any other operation. The same also holds even in the following procedure of updating.

By changing the method of updating which depend upon the cell capacity of the mobile communication terminal 200 and the processing capability of the control section 201, the time required for the connection can be shortened and the consumption of electric power can be efficiently decreased at the time of origination. Concerning the updating of when the connection has failed after having started the connection processing to system A (step 312), the pre-origination connection score is multiplied by "0.5". In this case as well, the operation is not limited to multiplying by "0.5". Concerning the updating of when it is judged that the connection to system A has not been started (step 318), the pre-origination connection score is increased by "0.1". In this case as well, the operation is not limited to an increment of only "0.1".

The above method performs the judgment relying upon the threshold value and which requires simple processing. Further, when the connection score for system A becomes smaller than 1, the origination is not performed for system A making it possible to decrease the wasteful connection processing to system A. For instance, it is presumed that the initial value of the connection score for system A is 1, the connection score is updated and the start of origination is judged by the method illustrated in FIG. 4.

FIG. 5 is a diagram illustrating changes in the connection scores of when system A has repetitively performed the origination processing at a place out of the service area and the results of judging the start of origination. In the origination of the first time as shown, if the connection fails after the start of origination in system A, the connection score is updated to a value "0.5" which is acquired by multiplying the initial value 1 by "0.5". Therefore, in the origination from the second time to the sixth time, no connection processing is performed to system A. Thus, the wasteful origination can be decreased at a place where system A is out of the service area. The origination for system A starts in the seventh time after the connection score is increased five times each by "0.1" from the second time to the sixth time.

This makes it possible to flexibly cope with a case where a place that used to be out of the service area is now within the service area due to a change in the electromagnetic wave environment such as an increase in the number of the base stations or a case where the user used to perform the origination in the area L which is out of the service area for system A but now performs the origination in the area L which is in the service area for system A. Therefore, performing the origination, the time for accomplishing the connection can be shortened and the consumption of electric power can be effectively decreased. This further makes it possible to flexibly cope with a case where a place that used to be within the service area is now out of the service area or a case where the user used to perform the origination in the area L which is within the service area for system A but now performs the origination in the area L which is out of the service area for system A.

FIG. 6 is a diagram illustrating changes in the connection scores of when system A has changed from inside the service area to out of the service area and the results of judging the start of origination. As shown, the origination is at a place in the area L which is within the service area for system A from the first time to the sixth time but the origination at the seventh and subsequent times is at a place in the area L which is out of the service area for system A. When the origination is performed at a place which is out of the service area for system A, the connection score is increased by 0.5 times every time after the origination, and no origination is performed for system A at the tenth time to decrease wasteful origination for system A.

FIG. 7 is a diagram illustrating another method of judging the start of origination by using connection scores and of updating the connection scores. In this example, the connection scores are all real numbers of a sign which is not negative and are all set to assume the initial value of 1. The start of origination is judged at step 308 as described below.

First, when the connection score is not smaller than 1, the control section 201 judges that the origination to system A has started. The connection score which is not smaller than 0 but is smaller than 1 is used as a probability for judging the start of origination. For example, when the connection score is "0.25", the control unit 201 judges the start of origination with a probability of "0.25" and judges that the origination is not started with a probability of "0.75".

Concerning the updating of when the connection processing is performed to system A and when the connection is successful (step 314), the pre-origination connection score is increased by "0.5". Concerning this case as well as described above, the operation is not limited to an increment of "0.5". Concerning the updating of when the connection has failed after having started connection processing to system A (step 312), the pre-origination connection score is multiplied by "0.5". Concerning this case as well the operation is not limited to multiplying by "0.5" as described above.

Concerning the updating of when it is judged that the connection to system A has not been started (step 318), the connection score is not changed. Concerning this case as well the connection score may be changed and it can be contrived to multiply it by, for example "1.1". This method which employs the probability makes it possible to perform the judgment more effectively than the judging method of FIG. 4. Therefore, in performing the origination, the time for the connection can be shortened and the consumption of electric power can be effectively decreased.

Figure 8:
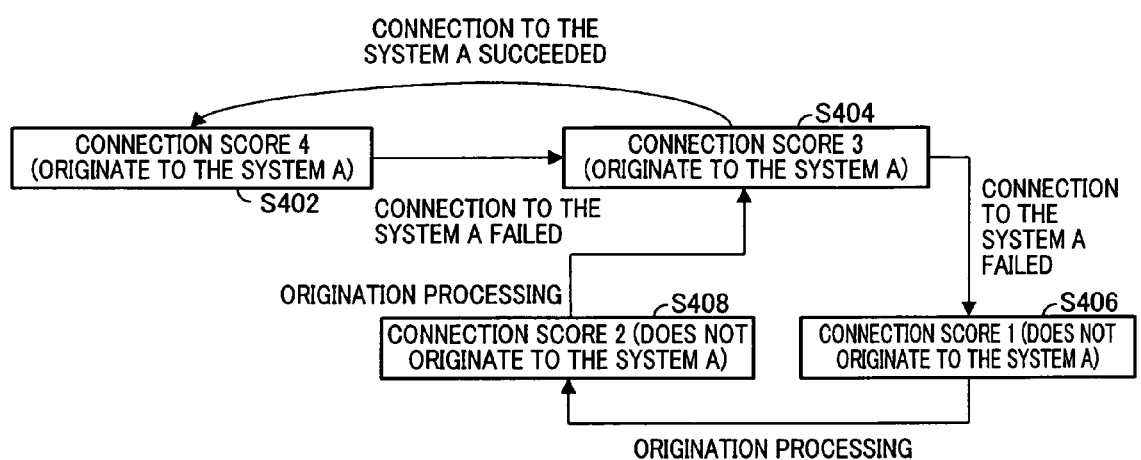
FIG. 8 is a diagram illustrating an additional method of judging the start of origination by using connection scores and of updating the connection scores.

FIG. 8 is a diagram illustrating an additional method of judging the start of origination by using connection scores and of updating the connection scores. In this example, the connection scores assume a value of 1, 2, 3 or 4. The connection scores are all set to assume the initial value of 4. As for judging the start of origination at step 308, the control section 201 judges that the origination for system A has started when the connection score is "3" or "4" and judges that the origination has not starting when the connection score is "1" or "2". The connection score is updated as described below.

Concerning the updating of when the connection has failed after having started the connection processing to system A (step 312) in the case where the pre-origination connection score is "4", the connection score is changed into "3". Concerning the updating of when the connection processing is performed to system A and when the connection is successful (step 314) in the case where the connection score is "3", the connection score is changed into "4". Concerning the updating of when the connection has failed after having started the connection processing to system A (step 312), the connection score is changed into "1".

Concerning the updating of when it is judged that the origination in system A has not been started (step 318) in the case where the connection score is "1", the connection score is changed into "2". In the updating of when it is judged that the origination in system A has not been started (step 318) in the case where the connection score is "2", the connection score is changed into "3". In other cases than those described above, the connection scores are not updated. Though the connection scores were limited to four values in the above example, there may be used a plurality of finite number of values other than four values.

(Need Paragraph indention) This makes it possible to shorten the time for the connection and to effectively decrease the consumption of electric power. This method also makes it possible to acquire the same effect as the method of FIG. 4.

The methods of judging the start of origination by using the connection scores and of updating the connection scores are not limited to the methods shown in FIGS. 4, 7 and 8. Further, the methods shown in FIGS. 4, 7 and 8 can be used in combination. This makes it possible to flexibly judge the start of origination in the wireless systems and hence, to effectively shorten the time for connection and to effectively decrease the consumption of electric power.

B. Second Embodiment

Figure 9:
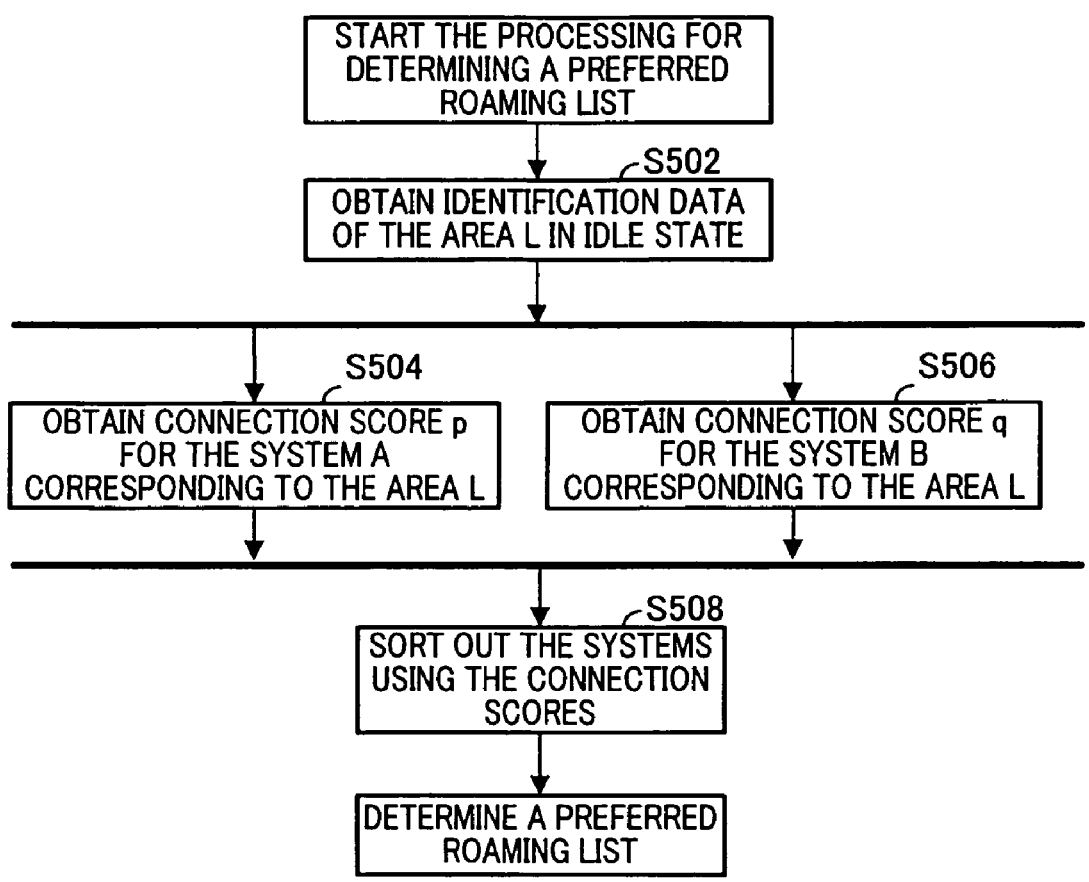
FIG. 9 is a diagram illustrating a sequence of determining a preferred roaming list according to a second embodiment.
Figure 10:
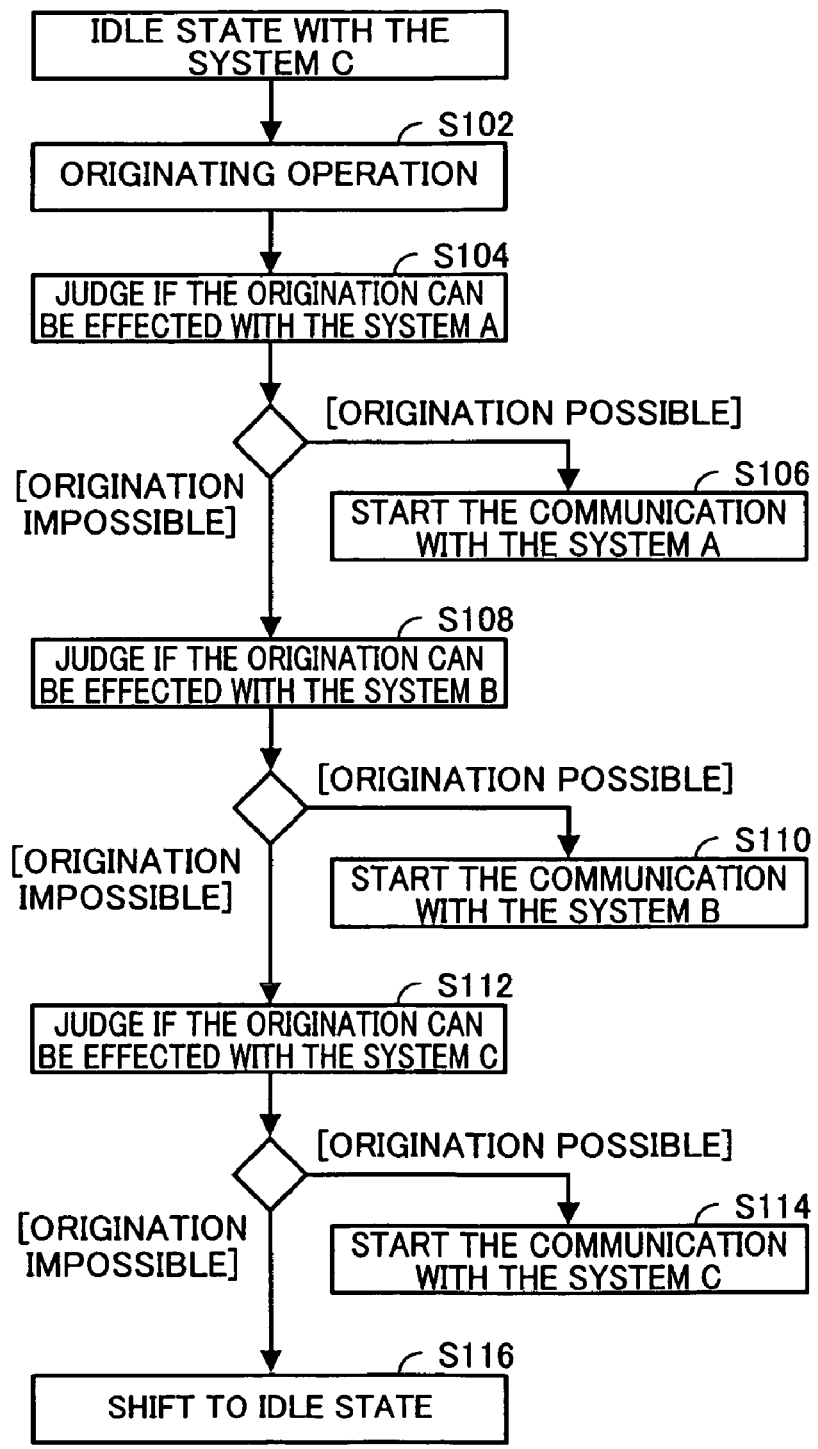
FIG. 10 is a diagram illustrating a sequence of origination according to prior art.

The above first embodiment has dealt with the origination processing by using connection scores of when a preferred roaming list has been determined beforehand for a plurality of wireless systems. The second embodiment deals with a method of updating the preferred roaming list for the wireless systems by using the updated connection scores. The terminal constitution and the connection scores are the same as those of the above first embodiment and will not described here again. Described below with reference to FIG. 9 is a sequence for determining the preferred roaming list.

The mobile communication terminal 200 can be used with two different wireless systems A and B and is presumed to be in the idle state with system B. This, however, is simply an example like the above first embodiment and the number of the wireless systems that can be used may not be two but more than two.

When processing starts for determining the preferred roaming list, the control section 201 first acquires, through the present position acquisition section 207, the area identification data of the area L where it is placed in the idle state (step 502). Next, the control section 201 executes the following two processes. The first process is to acquire a connection score p for system A corresponding to the area L from the table of connection scores held in the storage section 203 (step 504). The second process is to acquire a connection score q for system B corresponding to the area L from the table of connection scores held in the storage section 203 (step 506).

After having finished these two processes, the systems are finally sorted out by the connection scores (step 508) and the result becomes a preferred roaming list. For example, when the connection scores are updated and the start of origination is judged according to the method shown in FIG. 4, it is presumed that the connection scores are assuming values as shown in FIG. 2. If the mobile communication terminal 200 is in the idle state at present with the base station of a specific base station number 112233, then, p=0.2 and q=12, and the priority order in the preferred roaming list is system B, system A.

The origination processing after the preferred roaming list is determined for the systems is the same as that of the first embodiment. Furthermore, any method of the first embodiment can be used. In the second embodiment, the preferred roaming list for the wireless systems for effecting the origination is found relying upon the connection scores. Therefore, at the time of origination, the start of origination is judged first for a system that is highly probable to succeed in the connection which effectively shortens the time for connection and decreases the consumption of electric power.

While the present invention has been described with reference to the preferred embodiments, it is intended that the invention be not limited by any of the details of the description therein but includes all the embodiments which fall within the scope of the appended claims.

What is claimed is:

1. A mobile communication terminal capable of using a plurality of wireless systems, comprising:
   a storage means for storing area identification data identifying each communication area and connection indexes respectively corresponding to said area identification data showing an ease of connecting to each plurality of wireless systems;
   a present position acquisition means for acquiring present position data;
   a selection means for selecting area identification data from said storage means corresponding to present position data acquired by said present position acquisition means;
   an extraction means for extracting a connection index of each said plurality of wireless systems from said storage means corresponding to area identification data selected by said selection means; and
   a remote end determination means for determining, as a remote end, a wireless system having a connection index most easily connectable from among said connection indexes of said plurality of wireless systems extracted by said extraction means.

2. The mobile communication terminal according to claim 1, wherein said remote end determination means sorts said connection indexes of said plurality of wireless systems extracted by said extraction means by size and determines, as a remote end, a wireless system with a connection index with a largest value from among said connection indexes.

3. A communication control method performed in a mobile communication terminal capable of using a plurality of wireless systems, comprising:
   a present position acquisition process, performed by the mobile terminal, for acquiring present position data;
   an extraction process, performed by the mobile terminal, for storing beforehand area identification data identifying each communication area and connection index respectively corresponding to said area identification data and showing an ease of connecting to each plurality of wireless systems, selecting area identification data corresponding to present position data acquired by said present position acquisition process from among stored area identification data, and extracting a connection index of each of a plurality of wireless systems corresponding to said selected area identification data; and
   a remote end determination process, performed by the mobile terminal, for determining, as a remote end, a wireless system having a connection index most easily connectable from among said connection index of said plurality of wireless systems extracted by said extraction process.

4. The communication control method according to claim 3, wherein said remote end determination process sorts said connection index of each said plurality of wireless systems extracted by said extraction process by size and determines, as a remote end, a wireless system with a connection index with a largest value from among said connection index.

* * * * *